Jan. 13, 1942.                    W. H. STOUT                    2,269,560
                                  PIPE COUPLER
                               Filed Jan. 15, 1940
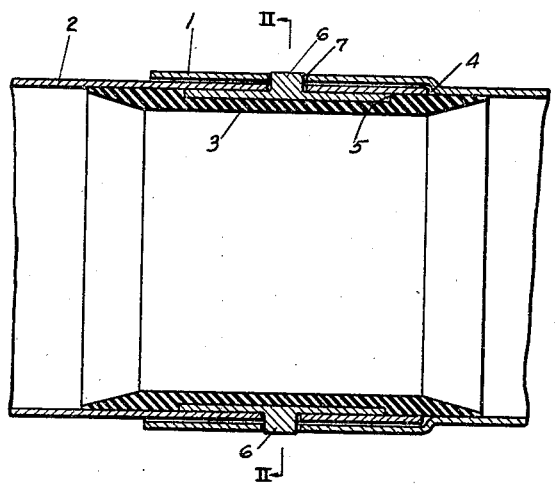
Fig. I
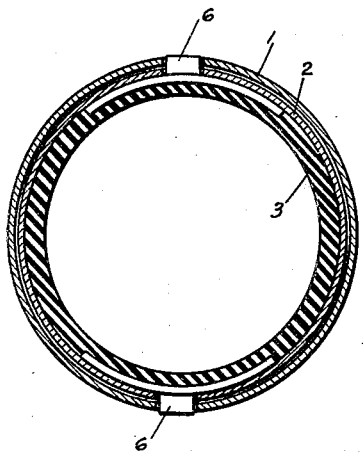
Fig. II
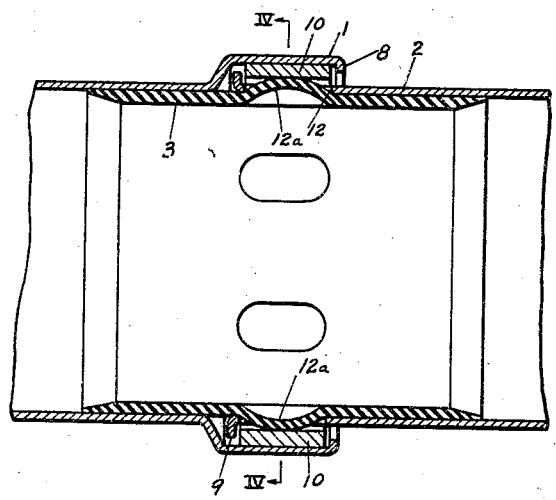
Fig. III
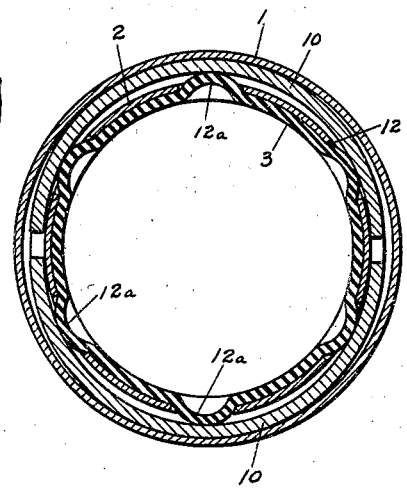
Fig. IV
INVENTOR
WILLIAM H. STOUT
BY G. F. McDougall.
ATTORNEY Patented Jan. 13, 1942

2,269,560

UNITED STATES PATENT OFFICE 2,269,560

PIPE COUPLER

William H. Stout, Eugene, Oreg.

Application January 15, 1940, Serial No. 313,809

5 Claims. (Cl. 285—168)

The present invention relates to a pipe coupler of the "slip-joint," properly called pressure sealed, type. It may be made with one half on a fitting and the other on the end of a pipe and still be essentially the same thing.

The essential thing in the sealing device is a rubber tube, insertable in one piece and a rather close fit therein, but which projects beyond the end of the piece so that when another pipe or part is coupled to it, the rubber tube will project into said other piece, overlapping the joint and making a close fit with the inner surface of the second piece, referring to the inside surface of the spigot and the corresponding surface of the belled piece below the bell proper.

It is an object of the present invention to build a sealing pipe coupler that provides a better water seal than the well known sharp edged gasket.

Another object is a sealing member that expands against both inner surfaces of a coupled pipe under influence of internal fluid pressure, relaxing when the pressure is not present, so that the coupler may be used repeatedly without wearing the sealing member enough to impair its function.

A further and important object is to utilize the expansive force of fluid inside the sealing member to work locking devices that operate to prevent internal pressure from blowing the two coupled pieces apart.

The foregoing and other objects that will be at once apparent to those familiar with self-sealing pipe couplers, constitute the purposes of the present invention, the scope of which is to be ascertained from the claims.

The drawing accompanies and forms a part of this specification in which are illustrated two very effective forms of practicing the invention with two types of pipe joint lock, which will at once suggest others that are within the scope of the claims.

In the drawing—

Fig. I shows a bell and spigot type of coupler that embodies the invention, with one form of pipe lock found satisfactory;

Fig. II is a section on the line II—II, Fig. I, showing the construction, supplementary to Fig. I;

Fig. III shows a bell and spigot joint type of coupler that varies from the first shown in Figs. I and II by being associated with a different kind of pipe lock also very satisfactory; and Fig. IV is a section taken at IV—IV, Fig. III.

I have hereinafter adopted the designation of "bell and spigot" for the parts of the pipe coupler, the bell being the larger part within which the smaller part or "spigot" is inserted, since this nomenclature is very old and well understood.

In Fig. I, numeral 1 is a bell and 2 is a spigot, in this case a straight tubular section that is insertable within the bell 1, with a sliding fit.

A tubular sealing member of rubber, 3, is inserted within the spigot 2 in such manner that when the two parts are brought into operative coupling relationship, the tubular rubber sealing member 3 overlaps the joint 4 in such manner and to such a degree that internal fluid pressure tends to seal the joint 4 absolutely water tight. The word "rubber" is here used to indicate rubber compositions or any synthetic composition having the well known characteristics of rubber.

In this case the rubber tube 3 is provided with a recess 5 to accommodate the head portion of the locking pin 6, which engages a hole 7 that is provided in the bell 1 and it will be seen that this pin may be easily depressed to unlock the pin 6 from the hole 7 when there is no internal fluid pressure within the pipes, but that it will be held securely in place by fluid pressure when any exists.

For convenience in assembly it will be noted that the rubber tube 3 being recessed is not readily displaceable lengthwise from the pin 6; hence ordinarily no other internal fastening of the rubber tube 3 into the spigot 2 will be required. Two pins 6 are shown that are diametrically opposite but unless the pressure is quite high only one will be required.

In Fig. III, the bell member is differently shaped though it is still a bell as heretofore defined; hence is given the same reference numeral 1 and the spigot being still a spigot is also designated by the numeral 2. The tubular sealing member 3 is the same save that the recess 5 is omitted.

In Figs. III and IV, internal fluid pressure will be presumed to be present. The spigot 2 has a flange 9 formed on its outer end though this need not be continuous. Under ordinary pressure conditions several flange shaped fingers will be sufficient. The bell 1 is somewhat larger than before and has a downturned flange 8 at its outer end; but here again it is not essential that the flange 8 be continuous as explained. The flange 9 will slip easily under the downturned flange 8 to insert or withdraw the spigot from the bell.

A two part annular ring 10 is also so formed that it will slip easily into place under the downturned flange 8 when there is no fluid pressure but when fluid pressure exists, the median portion of the rubber tube 3 expands partly through the apertures 12 as shown at 12a, the parts of the ring 10 are forced outwardly against the inner wall of the bell 1 and the two flanges 9 and 8 effectively prevent the pipe sections from blowing apart, with the ring 10 in place.

This is clearly shown in Fig. III. When pressure falls to zero the natural tendency of the rubber tube to resume its original outline unlocks the ring 10 and the bell and spigot are easily separated.

The effectiveness of the expansible rubber tube is of course dependent on rather close contact of its perimeter with both parts to be sealed, the inside of the spigot and that part of the belled portion beyond the bell proper that has substantially the same inside diameter as the spigot, though variations within small limits are permissible, especially by providing a rubber tube that is larger at one end than at the other, but this will be the unusual case.

It will be at once apparent that variations in construction are easily made without departing from the principles disclosed hence it is not intended to limit the invention to the specific disclosures, but only by the appended claims.

I claim:

1. In a pipe coupler of the character described, a bell member with a restricted entrance, a spigot member having an enlarged outer end insertable in the bell, an expansible ring member insertable between the bell and spigot, a tubular rubber sealing member within the bell and spigot and means dependent on expansion of the sealing member by internal fluid pressure for expanding the ring to prevent withdrawal of the spigot from the bell.

2. A pipe coupler comprising a bell member, a spigot member insertable in the bell, a tubular sealing device inside the bell and spigot that overlays the joint between the two members to seal the same and a movable annular ring insertable between the bell and spigot effective to lock the bell and spigot together when held against the inside of the bell and means for moving said annular member against the inside of the bell by influence of internal fluid pressure exerted within the tubular sealing device.

3. A pipe coupling comprising a bell member, a spigot member insertable therein, an inner elastic sealing tube overlapping the spigot and bell, the said spigot provided with an opening within the bell when the members are assembled, and movable means positioned outside of the spigot effective to lock the two members against separation by expansion of the tubular sealing member through the said opening under influence of internal fluid pressure.

4. A pipe coupling, comprising a bell member, a spigot member insertable within the bell, and an elastic tubular sealing device positioned withing the bell and spigot in overlapping relation to the inner end of the spigot and the bottom of the bell, the said spigot provided with an opening near its end through which the sealing tube is expansible by internal pressure, and means movable by such expansion to lock the coupling.

5. A pipe coupler comprising a bell member, a spigot insertable within the bell, the said spigot being provided with an opening through the wall thereof positioned to be inside the bell when the members are assembled, an expansible tubular sealing device within the spigot that overlaps the bottom of the bell, and means movable under influence of expansion of said tubular sealing device through said opening effective to lock the spigot to the bell.

WILLIAM H. STOUT.